United States Patent
Tiwari et al.

(10) Patent No.: US 10,381,088 B2
(45) Date of Patent: Aug. 13, 2019

(54) SYSTEM AND METHOD FOR GENERATING RANDOM NUMBERS BASED ON NON-VOLATILE MEMORY CELL ARRAY ENTROPY

(71) Applicant: Silicon Storage Technology, Inc., San Jose, CA (US)

(72) Inventors: Vipin Tiwari, Dublin, CA (US); Mark Reiten, Alamo, CA (US)

(73) Assignee: Silicon Storage Technology, Inc., San Jose, CA (US)

( * ) Notice: Subject to any disclaimer, the term of this patent is extended or adjusted under 35 U.S.C. 154(b) by 0 days.

(21) Appl. No.: 15/905,720

(22) Filed: Feb. 26, 2018

(65) Prior Publication Data

US 2018/0286486 A1    Oct. 4, 2018

Related U.S. Application Data

(60) Provisional application No. 62/479,193, filed on Mar. 30, 2017.

(51) Int. Cl.
| | | |
|---|---|---|
| G11C 16/24 | (2006.01) | |
| H01L 27/11521 | (2017.01) | |
| G06F 7/58 | (2006.01) | |
| G11C 16/28 | (2006.01) | |
| G11C 16/04 | (2006.01) | |
| G11C 16/22 | (2006.01) | |
| H01L 29/423 | (2006.01) | |

(52) U.S. Cl.
CPC ............. *G11C 16/24* (2013.01); *G06F 7/588* (2013.01); *G11C 16/0425* (2013.01); *G11C 16/22* (2013.01); *G11C 16/28* (2013.01); *H01L 27/11521* (2013.01); *H01L 29/42328* (2013.01)

(58) Field of Classification Search
CPC ..... G11C 16/24; G11C 16/22; G11C 16/0425; G11C 16/28; H01L 29/42328; H01L 27/11521; G06F 7/588
See application file for complete search history.

(56) References Cited

U.S. PATENT DOCUMENTS

| | | | |
|---|---|---|---|
| 5,455,792 A * | 10/1995 | Yi | ..................... H01L 29/42328 257/316 |
| 6,161,213 A * | 12/2000 | Lofstrom | .............. H01L 23/544 257/E23.179 |
| 6,222,227 B1 | 4/2001 | Chen | |
| 7,142,452 B1 | 11/2006 | Tiwari | |
| 7,927,994 B1 | 4/2011 | Liu et al. | |

(Continued)

*Primary Examiner* — Ajay Ojha
(74) *Attorney, Agent, or Firm* — DLA Piper LLP (US)

(57) ABSTRACT

A memory device that generates a unique identifying number, and includes a plurality of memory cells and a controller. Each of the memory cells includes first and second regions formed in a semiconductor substrate, wherein a channel region of the substrate extends between the first and second regions, a floating gate disposed over and insulated from a first portion of the channel region, and a select gate disposed over and insulated from a second portion of the channel region. The controller is configured to apply one or more positive voltages to the first regions of the memory cells while the memory cells are in a subthreshold state for generating leakage current through each of the channel regions, measure the leakage currents, and generate a number based on the measured leakage currents.

22 Claims, 6 Drawing Sheets

(56) References Cited

U.S. PATENT DOCUMENTS

| | | | |
|---|---|---|---|
| 2010/0287604 A1 | 11/2010 | Potkonjak et al. | |
| 2013/0093502 A1* | 4/2013 | Kim | H01H 85/0241 |
| | | | 327/525 |
| 2014/0136583 A1 | 5/2014 | Hyde et al. | |
| 2014/0269058 A1* | 9/2014 | Liu | G11C 11/5628 |
| | | | 365/185.03 |
| 2014/0269062 A1* | 9/2014 | Do | G11C 16/26 |
| | | | 365/185.05 |
| 2016/0148679 A1* | 5/2016 | Yoshimoto | G11C 13/004 |
| | | | 365/148 |

* cited by examiner

SYSTEM AND METHOD FOR GENERATING RANDOM NUMBERS BASED ON NON-VOLATILE MEMORY CELL ARRAY ENTROPY

This application claims the benefit of U.S. Provisional Application No. 62/479,193, filed Mar. 30, 2017, and which is incorporated herein by reference.

FIELD OF THE INVENTION

The present invention relates to non-volatile memory devices.

BACKGROUND OF THE INVENTION

Currently, applications exist for semiconductor devices to include an on-chip random number generator for generating a unique identifier for security applications. The unique identifier should be generated in a manner where it would be difficult if not impossible to re-create the number in a similar device, even if that similar device originates from the same wafer. The number would be fixed and unchanged over the lifetime of the device.

The prevalence of programmable non-volatile memory, either in stand-alone chips, or semiconductor devices with embedded non-volatile memory, make it an ideal candidate for providing unique identifier numbers. For example, U.S. Pat. No. 7,142,452 describes exploiting the inherent randomness involved in the fabrication of non-volatile memory arrays as a secure lock. Specifically, the initial bit value (i.e. program state) of each memory cell is unknown and varied after fabrication. If each cell has just two programming states (programmed and unprogrammed), just one 32 bit pattern of cells provides the odds that another pattern will match it to be two to the power of 32, which is over 4 billion. Therefore, numerical identifier numbers based on initial programming state could be generated.

While the initial programming state provides some randomness, in most cases it does not provide true randomness as most cells are either programmed or not programmed. It is difficult to achieve near 50/50 odds of any given cell being either in a programmed or non-programmed state. Therefore, the initial programming state alone would not provide truly unique identifier numbers without using an excessive number of memory cells.

There is a need to exploit the inherent randomness of non-volatile memory array fabrication so generate truly unique identifier number.

BRIEF SUMMARY OF THE INVENTION

The aforementioned problems and needs are addressed by a memory device that includes a plurality of memory cells and a controller. Each of the memory cells includes first and second regions formed in a semiconductor substrate, wherein a channel region of the substrate extends between the first and second regions, a floating gate disposed over and insulated from a first portion of the channel region, and a select gate disposed over and insulated from a second portion of the channel region. The controller is configured to apply one or more positive voltages to the first regions of the memory cells while the memory cells are in a subthreshold state for generating leakage current through each of the channel regions, measure the leakage currents, and generate a number based on the measured leakage currents.

The memory device can include a plurality of pairs of memory cells and a controller, where each pair of the memory cells includes first, second and third regions formed in a semiconductor substrate, wherein a first channel region of the substrate extends between the first and second regions, and a second channel region of the substrate extends between the second and third regions, a first floating gate disposed over and insulated from a first portion of the first channel region, a second floating gate disposed over and insulated from a first portion of the second channel region, a first select gate disposed over and insulated from a second portion of the first channel region, and a second select gate disposed over and insulated from a second portion of the second channel region. The controller configured to apply one or more positive voltages to the second regions, or to the first and third regions, of the memory cells while the memory cells are in a subthreshold state for generating leakage current through each of the first and second channel regions, measure the leakage currents, and generate a number based on the measured leakage currents.

A method of identifying a memory device which includes a plurality of memory cells. Each of the memory cells includes first and second regions formed in a semiconductor substrate, wherein a channel region of the substrate extends between the first and second regions, a floating gate disposed over and insulated from a first portion of the channel region, and a select gate disposed over and insulated from a second portion of the channel region. The method includes applying one or more positive voltages to the first regions of the memory cells while the memory cells are in a subthreshold state for generating leakage current through each of the channel regions, measuring the leakage currents, and generating a number based on the measured leakage currents.

A method of identifying a memory device that includes a plurality of pairs of memory cells. Each pair of the memory cells includes first, second and third regions formed in a semiconductor substrate, wherein a first channel region of the substrate extends between the first and second regions, and a second channel region of the substrate extends between the second and third regions, a first floating gate disposed over and insulated from a first portion of the first channel region, a second floating gate disposed over and insulated from a first portion of the second channel region, a first select gate disposed over and insulated from a second portion of the first channel region, and a second select gate disposed over and insulated from a second portion of the second channel region. The method includes applying one or more positive voltages to the second regions, or to the first and third regions, of the memory cells while the memory cells are in a subthreshold state for generating leakage current through each of the first and second channel regions, measuring the leakage currents, and generating a number based on the measured leakage currents.

Other objects and features of the present invention will become apparent by a review of the specification, claims and appended figures.

DETAILED DESCRIPTION OF THE INVENTION

The present invention is system and method of exploiting and accentuating the fabrication entropy randomness of non-volatile memory cells to generate a unique identifier for that device. The invention will be discussed with respect to a four gate non-volatile memory cell array, but other memory cell configurations with additional or fewer gates could be used.

Figure 1:
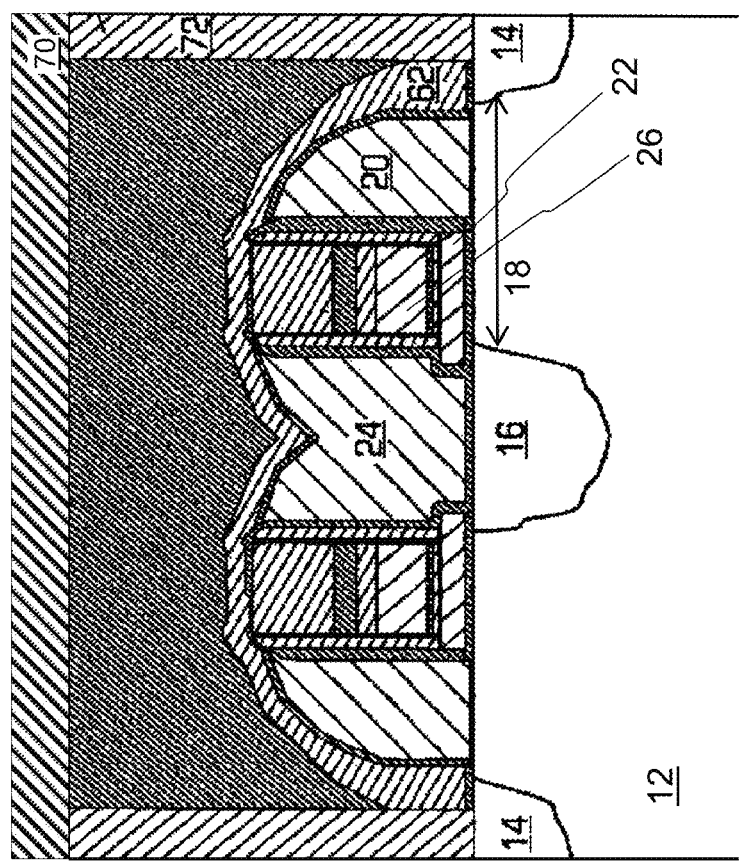
FIG. 1 is a side cross section view of a memory cell having four conductive gates.

U.S. Pat. No. 7,927,994 discloses a split gate non-volatile memory cell device having four gates, and its operation. This split gate memory cell device includes an array of memory cells arranged in rows and columns. FIG. 1 illustrates a pair of such memory cells formed on a semiconductor substrate 12. Source and drain diffusion regions 16/14 are formed in the substrate 12, defining a channel region 18 there between. Each of the memory cells has four conductive gates: a select gate 20 (also called a word line gate) disposed over and insulated from a first portion of the channel region 18, a floating gate 22 disposed over and insulated from a second portion of the channel region 18 and a portion of the source region 16, an erase gate 24 disposed over and insulated from the source region 16, and a control gate 26 disposed over and insulated from the floating gate 22. Preferably, the erase gate 24 can have an upper portion that is disposed vertically over the floating gate 22 (e.g. a vertical overhang).

Figure 2:
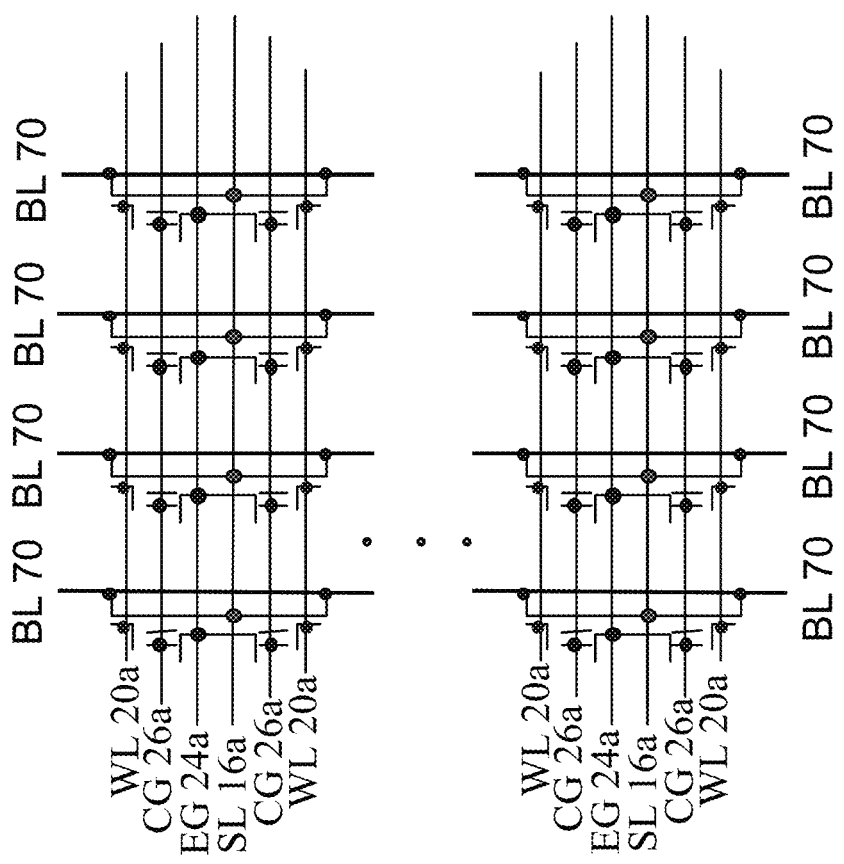
FIG. 2 is a schematic diagram showing a portion of an array of memory cells.

The memory cells are arranged in an array, with columns of such memory cells separated by columns of isolation regions in an interlaced fashion. Each column of memory cells contains pairs of the memory cells in FIG. 1 arranged end to end, whereby each pair of memory cells share the same source region 16, and adjacent pairs share the same drain region 14. The select gates 20 for an entire row of the memory cells are formed as a single conductive line 20a (commonly referred to as a word line WL), such that each word line 20a forms the select gate 20 for one of the memory cells in each column of the memory cells (i.e. each word line electrically connects together a row of the select gates 20). The control gates 26 are similarly formed as a continuous control gate line 26a extending along the row of memory cells (i.e. electrically connecting together a row of the control gates 26), and the erase gates 24 are also similarly formed as a continuous erase gate line 24a extending along the row of memory cells (i.e. electrically connecting together a row of the erase gates 24). The source regions 16 are continuously formed as a source line 16a that extends in the row direction and serves at the source regions 16 for the entire row of memory cell pairs (i.e. electrically connecting together a row of the source regions 16). Conductive bit line contacts 72 electrically connect the drains 14 to a bit line 70, whereby each column of drain regions 14 are electrically connected together by a bit line 70. FIG. 2 illustrates a schematic representation of a portion of the memory array.

An individual target memory cell can be erased, programmed and read by applying various voltages to the selected lines for the target memory cell (i.e. the word line 20, bit line 70, source line 16, control gate line 26 and erase gate line 24 associated with the targeted memory cell), and by applying various voltages to the unselected lines (i.e. the word lines 20, bit lines 70, source lines 16, control gate lines 26 and erase gate lines 24 not associated with the targeted memory cell).

For example, for erase operation, the following voltages may be applied to the selected (Sel.) lines and unselected (Unsel.) lines:

| WL (20) | | BL (70) | | SL (16) | | CG (26) | | EG (24) | |
|---|---|---|---|---|---|---|---|---|---|
| Sel. | Unsel. | Sel. | Unsel. | Sel. | Unsel. | Sel. | Unsel. | Sel. | Unsel. |
| 0 v | 0 v | 0 v | 0 v | 0 v | 0 v | 0 v or −6 to −9 v | 0 v | 9-11 v or 7-9 v | 0 v |

During erase, a voltage of 9-11 volts is applied to the erase gate 24, to cause electrons to tunnel from the floating gate 22 to the erase gate 24. An optional negative voltage on the order of −6 to −9 volts may be applied to the selected control gate 26. In that event, the voltage applied to the selected erase gate 24 may be lowered to approximately 7-9 volts. It is also known to use a voltage of 11.5 volts on the selected erase gate line 24, with zero voltages on all other lines.

For programming, the following voltages may be applied to the selected (Sel.) lines and unselected (Unsel.) lines:

| WL (20) | | BL (70) | | SL (16) | | CG (26) | | EG (24) | |
|---|---|---|---|---|---|---|---|---|---|
| Sel. | Unsel. | Sel. | Unsel. | Sel. | Unsel. | Sel. | Unsel. | Sel. | Unsel. |
| 1-2 v | 0 v | 0.5-5 uA | 1.5-3 v | 3-6 v | 1 v | 6-9 v | 0 v | 6-9 v | 0 v |

During programming, the target memory cell is programmed through efficient hot-electron injection with the portion of the channel under the floating gate in inversion. The medium voltage of 3-6 volts is applied to the selected source line SL to generate the hot electrons. The selected control gate 26 and erase gate 24 are biased to a high voltage (6-9 volts) to utilize the high coupling ratio and to maximize the voltage coupling to the floating gate 22. The high voltage coupled to the floating gate induces floating gate channel inversion and concentrates the lateral field in the split area to generate hot electrons more effectively, which are injected onto the floating gate 22. In addition, the voltages provide a high vertical field to attract hot electrons onto the floating gate and reduce the injection energy barrier.

It is also known to use the following combination of programming voltages:

| WL (20) | | BL (70) | | SL (16) | | CG (26) | | EG (24) | |
|---|---|---|---|---|---|---|---|---|---|
| Sel. | Unsel. | Sel. | Unsel. | Sel. | Unsel. | Sel. | Unsel. | Sel. | Unsel. |
| 0.8 v | 0 v | 1.0 uA | >1.08 v | 4.5 v | 0.5 v | 10.5 v | 0-2.5 v | 4.5 v | 0.5 v |

For reading, the following voltages may be applied to the selected (Sel.) lines and unselected (Unsel.) lines:

| WL (20) | | BL (70) | | SL (16) | | CG (26) | | EG (24) | |
|---|---|---|---|---|---|---|---|---|---|
| Sel. | Unsel. | Sel. | Unsel. | Sel. | Unsel. | Sel. | Unsel. | Sel. | Unsel. |
| 1.5-3.7 v | 0 v | 0.5-1.5 v | 0 v | 0 v | 0 v | 0 v-3.7 V | 0 v | 0 v-3.7 V | 0 v |

During a read operation, depending upon the balance between program and read operations, the voltages on the selected control gate 26 and the selected erase gate 24 can be balanced because each is coupled to the floating gate. Thus, the voltages applied to each of the selected control gates 26 and selected erase gates 24 can be a combination of voltages ranging from 0 to 3.7 volts to achieve an optimum window. In addition, because the voltage on the selected control gate 26 is unfavorable due to the capacitive RC coupling, voltages on the selected erase gate 24 can result in a faster read operation. It is also known in a read operation to apply a voltage of 1.2 volts on the selected word line and a voltage of 2.5 volts on the unselected control gate 26. During a read operation, the voltage on the select gate turns on (makes conductive) the portion of the channel region under the select gate 20. If the floating gate is programmed with electrons, the portion of the channel region under the floating gate will not conduct or provide little conduction. If the floating gate is not programmed with electrons, the channel region under the floating gate will be conductive. The conductivity of the channel region is sensed to determine if the floating gate is programmed with electrons or not.

Generating a random number that is unique to the array of memory cells is accomplished by dedicating a predetermined number of the memory cells in the array for this purpose. These dedicated cells are preferably never programmed or erased, but instead are maintained in their original fabricated state (i.e. the program states of these memory cells are not changed from their program states that existed at the time the memory array is fabricated). It has been discovered that by reading these memory cells in pairs using differential sensing (which requires 4 memory cells for each bit of information), in subthreshold operation (meaning that the select gates are off so that the channel regions under the select gates are off, wherein any detected read current is leakage current only), that the leakage current provides a good measure of the randomness of the cells.

Figure 3:
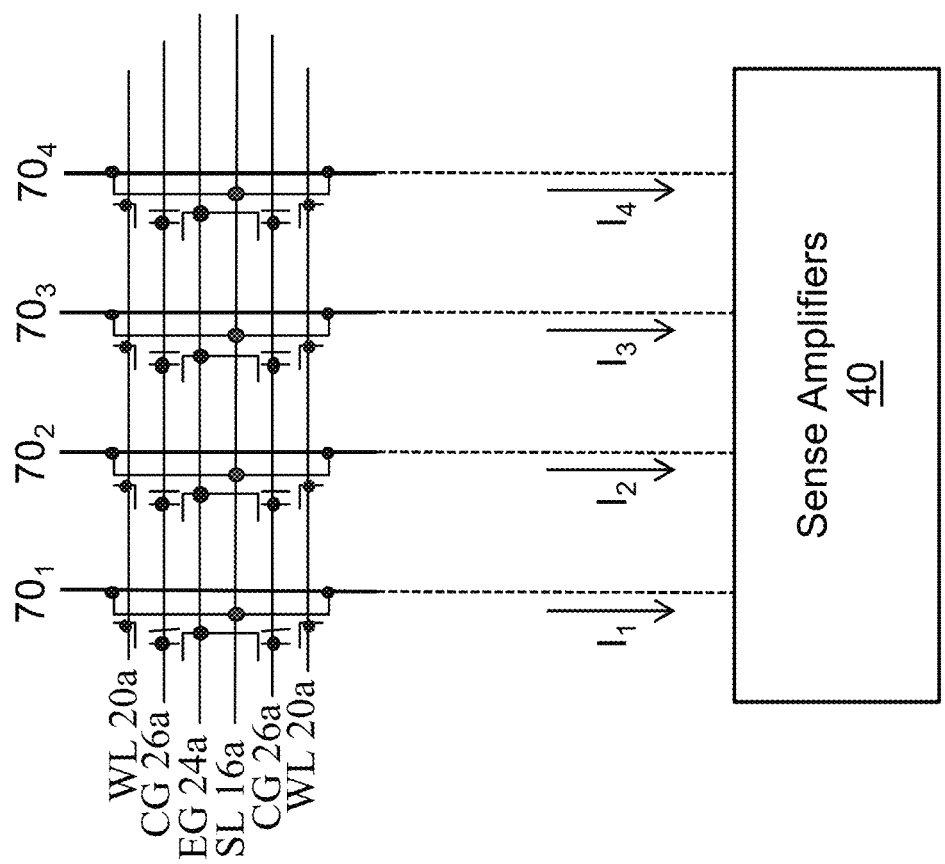
FIG. 3 is a schematic diagram showing pairs of memory cells used for generating a random number that is unique to the array of memory cells.

FIG. 3 best illustrates this subthreshold, differential sensing. This figure schematically illustrates 8 memory cells (i.e., four pairs of memory cells), with each pair of memory cells extending in the column direction and connected to a different bit line 70, all sharing a common source line 16a. A subthreshold voltage (e.g., 0.7V-1.5V) is applied to the source line 16a, with zero or very small voltages on the remaining lines/regions) producing leakage current I for each of the pairs of memory cells on each of the bit lines, which is detected and measured by sense amplifiers 40. For example, leakage current $I_1$ is generated from the first pair of cells on bit line $70_1$, where each of the memory cells leak current from its source to its drain and the total current leakage from the two memory cells is $I_1$, $I_2$ is generated from the second pair of cells on bit line $70_2$, $I_3$ is generated from the third pair of cells on bit line $70_3$, and so on. Differential sensing is accomplished by subtracting the total leakage current $I_1$ on bit line $70_1$ from the total leakage current $I_2$ on bit line $70_2$ to determine a first bit value (with a positive result being considered a 1 and a negative result being considered a 0), subtracting the total leakage current $I_2$ on bit line $70_2$ from the total leakage current $I_3$ on bit line $70_3$ to determine a second bit value (with a positive result being considered a 1 and a negative result being considered a 0), subtracting the total leakage current $I_3$ on bit line $70_3$ from the total leakage current $I_4$ on bit line $70_4$ to determine a third bit value (with a positive result being considered a 1 and a negative result being considered a 0), and so on. Each bit value of information is derived from the leakage current of four memory cells, combined onto two bit lines, with the two combined currents being subtracted from each other to yield a positive or negative result reflective of a single bit value. It is the combination of these single bit values for all of the dedicated memory cells that provides a number that is random (reflecting the randomness of the memory cell fabrication cell-to-cell). This combination of single bit values is unique to the memory cell array, and can be reliably and repeatably read from the memory cell array over the life of the product incorporating the memory cell array. Subtracting leakage currents can be implemented by actually subtracting one leakage current from another, or by subtracting leakage current values determined from the measured leakage currents. Differential sensing can instead be implemented by comparing measured leakage currents. Comparing leakage currents can be implemented by actually comparing two leakage currents, or by comparing leakage current values determined from the measured leakage currents. For example, the binary determination of 1 or 0 can be determined based on if the leakage current on the higher numbered bit line is greater than that on the lower numbered bit line.

To enhance signal integrity and memory cell randomness, it is preferable to use a dedicated pair of rows or even a sector of the memory cells for this random number generation. It may be desirable to utilize a buffer zone of memory cells (i.e. adjacent rows and/or columns) which are not used for any purpose. By not reading, programming or erasing cells in the buffer zone, the chances of disturbing the original randomness of the memory cells used for generating the random number are reduced.

This technique has many advantages. First, by combining (summing) the current from two adjacent cells, the resulting current signal at any given bit line is roughly twice that of individual cells, making measurements more accurate. Second, because sensing/reading time is a function of current amplitude, the reading process is much faster. Third, differential sensing means that there need not be any threshold or reference value comparisons that can introduce error or drift over time. Fourth, random number generation is accomplished without structurally changing any of the memory array. Fifth, by grouping adjacent memory cells together and summing their current, fabrication similarities in adjacent cells are screened out.

In an alternate embodiment, the memory cells used to generate the random number could be softly (i.e. lightly) programmed or erased. This could create artificial randomness that is greater than the natural randomness resulting just from fabrication variations. Other alternate embodiments include applying a small bias to the word lines 20a and/or control gate lines 26a so that the memory cells are closer to, but still under threshold, to increase the leakage current signals being measured by the sense amplifiers. In addition, more than one pair of memory cells on any given bit line can be used to generate leakage current to generate a higher total leakage current (i.e., two or more source lines 16a can be provided with the positive voltage to generate the leakage current through the memory cells connected thereto). Lastly, the subthreshold voltage (e.g., 0.7V-1.5V) could be applied to the bit lines 70 instead of the source lines 16B, where the direction of leakage current is reversed.

Figure 4:
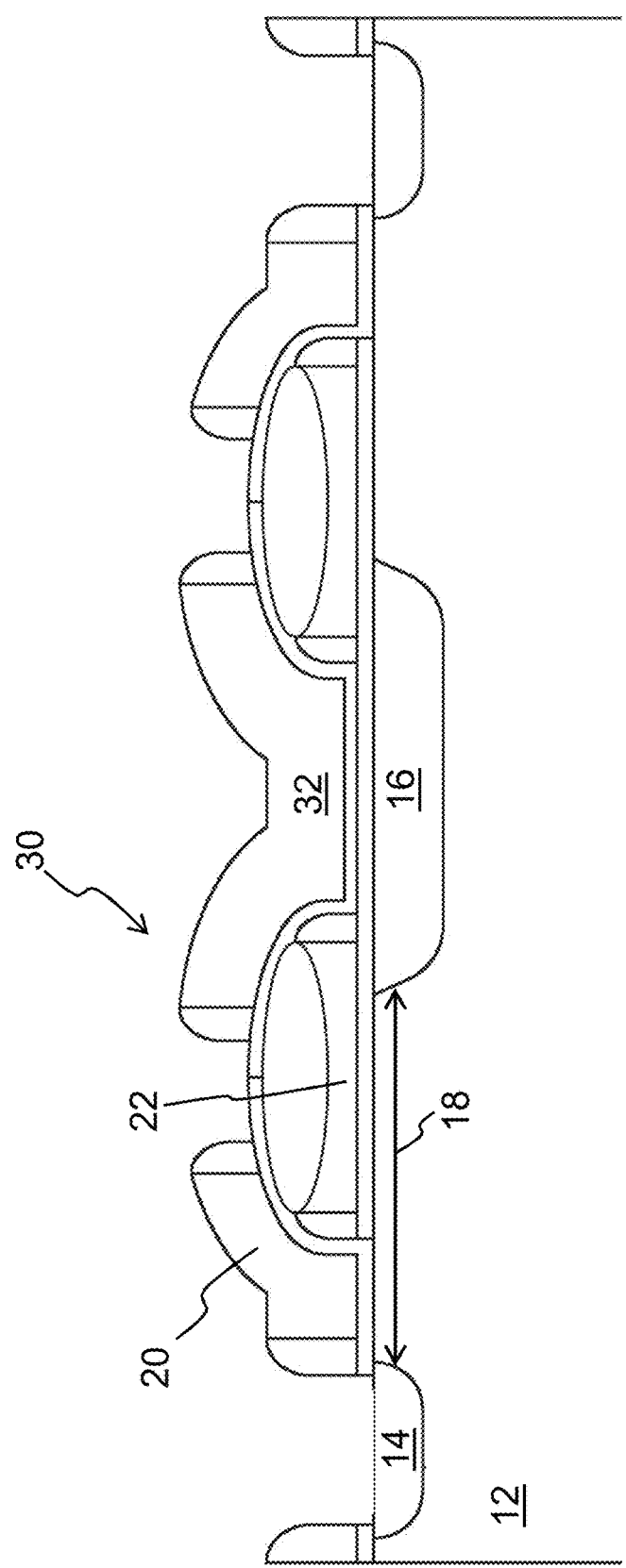
FIG. 4 is a side cross section view of a memory cell having three conductive gates.

The present invention is not limited to split gate memory cells having four gates. Specifically, the same random number generation could be implemented in memory devices having memory cells that lack the control gate 26 and/or the erase gate 24. For example, FIG. 4 illustrates an alternate embodiment of a split gate memory cell 30 with the same elements as the memory cell of FIG. 1, but instead of having separate control and erase gates, there is a single program/erase (PE) gate 32 disposed over and insulated from the source region 16 (i.e. this is a three gate design). The memory cell pair can be erased by placing a high voltage on the PE gate 32 to induce tunneling of electrons from the floating gates 22 to the PE gate 32. For normal operations used to store and read data, each memory cell can be programmed by placing positive voltages on the select gate 20, PE gate 32 and source region 16, and a current on drain region 14, to inject electrons from the current flowing through the channel region 18 onto floating gate 22. Each memory cell can be read by placing positive voltages on the select gate 20 and drain region 14, and sensing current flow.

Figure 5:
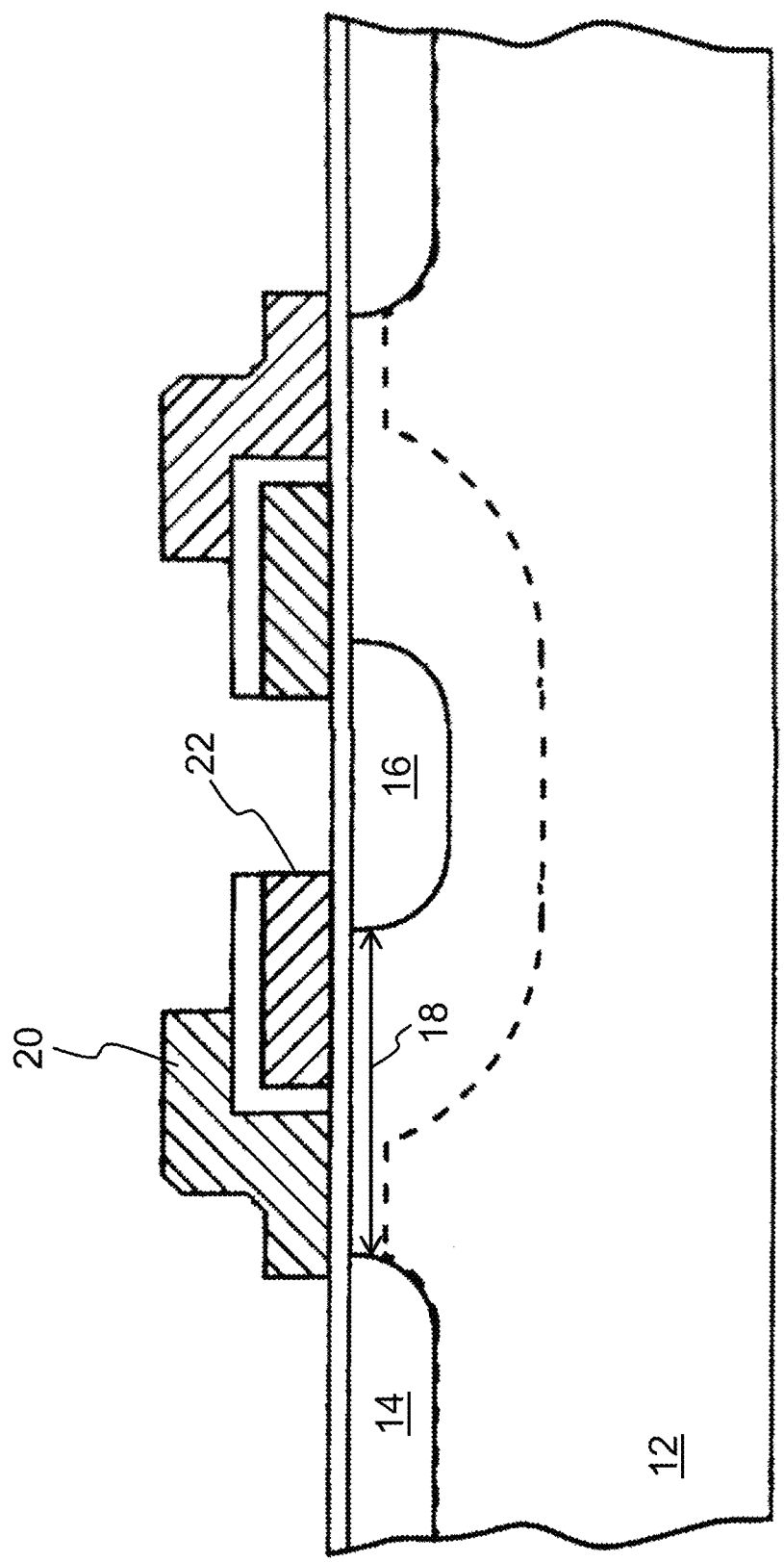
FIG. 5 is a side cross section view of a memory cell having two conductive gates.

FIG. 5 illustrates another alternate embodiment of a split gate memory cell with the same elements as the memory cell of FIG. 1, but without any control or erase gates. With this embodiment, the select gate 20 has an upper portion that extends up and over the floating gate 22. The memory cell can be erased by placing a high positive voltage on the select gate 20, and a reference potential on the source and drain regions 16/14, to induce tunneling of electrons from the floating gate 22 to the select gate 20. For normal operations used to store and read data, the memory cell can be programmed by applying a ground potential to drain region 14, a positive voltage on source region 16, and a positive voltage on the select gate 20. Electrons will then flow from the drain region 14 toward the source region 16, with some electrons becoming accelerated and heated whereby they are injected onto the floating gate 22 (leaving the floating gate negatively charged—the programmed state). The memory cell can be read by placing ground potential on the drain region 14, a positive voltage on the source region 16 and a positive voltage on the control gate 22 (turning on the channel region portion under the control gate 22), and sensing current flow.

Figure 6:
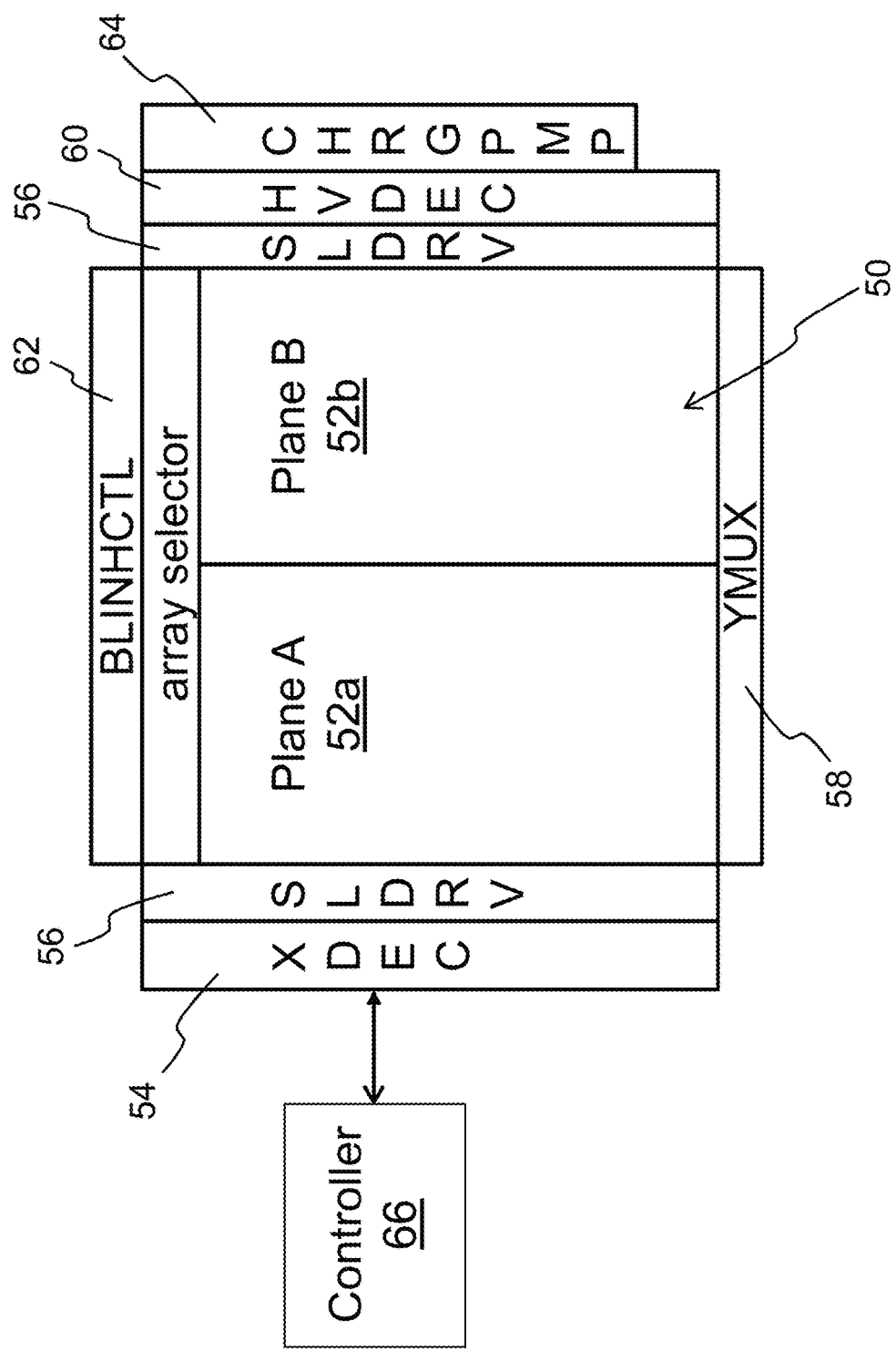
FIG. 6 is a diagram showing the architecture of a memory device according to the present invention.

The architecture of the memory device of the present invention is illustrated in FIG. 6. The memory device includes an array 50 of non-volatile memory cells, which can be segregated into two separate planes (Plane A 52a and Plane B 52b). The memory cells can be of the type shown in FIGS. 1 and 4-5, formed on a single chip, arranged in a plurality of rows and columns in the semiconductor substrate 12. Adjacent to the array of non-volatile memory cells are address decoders (e.g. XDEC 54 (row decoder), SLDRV 56, YMUX 58 (column decoder), HVDEC 60) and a bit line controller (BLINHCTL 62), which are used to decode addresses and supply the various voltages to the various memory cell gates and regions during read, program, and erase operations for selected memory cells. The column decoder includes the sense amplifiers 40. Controller 66 (containing control circuitry) controls the various device elements to implement each operation (program, erase, read) on target memory cells. Charge pump CHRGPMP 64 provides the various voltages used to read, program and erase the memory cells under the control of the controller 66. Controller 66 also implements the above described differential sensing in subthreshold operation to determine the random number associated with the memory device.

It is to be understood that the present invention is not limited to the embodiment(s) described above and illustrated herein, but encompasses any and all variations falling within the scope of any claims. For example, references to the present invention herein are not intended to limit the scope of any claim or claim term, but instead merely make reference to one or more features that may be covered by one or more of the claims. Materials, processes and numerical examples described above are exemplary only, and should not be deemed to limit any claims. While the subtractions or comparisons described above involved bit lines adjacent to each other, any combination of comparisons between any of the bit lines could be used.

It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements there between, as well as forming the element indirectly on the substrate with one or more intermediate materials/elements there between.

What is claimed is:
1. A memory device, comprising:
 a plurality of memory cells, wherein each of the memory cells includes:

first and second regions formed in a semiconductor substrate, wherein a channel region of the substrate extends between the first and second regions, a floating gate disposed over and insulated from a first portion of the channel region, and a select gate disposed over and insulated from a second portion of the channel region;

a controller configured to:

apply one or more positive voltages to the first regions of the memory cells while the memory cells are in a subthreshold state for generating leakage current through each of the channel regions, measure the leakage currents, and generate a number based on the measured leakage currents.

2. The device of claim 1, wherein the controller is configured to generate at least part of the number by subtracting or comparing the measured leakage currents for a first pair of the memory cells from or to the measured leakage currents for a second pair of the memory cells.

3. The device of claim 1, wherein a first pair of the memory cells are disposed adjacent to each other, and a second pair of the memory cells are disposed adjacent to each other, the device further comprising:

a first bit line connected to the second regions of the first pair of memory cells;

a second bit line connected to the second regions of the second pair of memory cells;

wherein the controller is configured to generate at least part of the number by subtracting or comparing leakage currents on the first bit line from or to leakage currents on the second bit line.

4. The device of claim 1, wherein a first pair of the memory cells are disposed adjacent to each other, and a second pair of the memory cells are disposed adjacent to each other, the device further comprising:

a first bit line connected to the first regions of the first pair of memory cells;

a second bit line connected to the first regions of the second pair of memory cells;

wherein the controller is configured to generate at least part of the number by subtracting or comparing leakage currents on the first bit line from or to leakage currents on the second bit line.

5. The device of claim 1, wherein each of the memory cells further comprises:

an erase gate disposed over and insulated from the first region.

6. The device of claim 4, wherein each of the memory cells further comprises:

a control gate disposed over and insulated from the floating gate.

7. The device of claim 1, wherein the controller is further configured to:

apply a positive voltage to the select gates while the memory cells are in a subthreshold state.

8. The device of claim 6, wherein the controller is further configured to:

apply a positive voltage to the control gates while the memory cells are in a subthreshold state.

9. A memory device, comprising:

a plurality of pairs of memory cells, wherein each pair of the memory cells includes:

first, second and third regions formed in a semiconductor substrate, wherein a first channel region of the substrate extends between the first and second regions, and a second channel region of the substrate extends between the second and third regions, a first floating gate disposed over and insulated from a first portion of the first channel region, a second floating gate disposed over and insulated from a first portion of the second channel region, a first select gate disposed over and insulated from a second portion of the first channel region, and a second select gate disposed over and insulated from a second portion of the second channel region;

a controller configured to:

apply one or more positive voltages to the second regions, or to the first and third regions, of the memory cells while the memory cells are in a subthreshold state for generating leakage current through each of the first and second channel regions, measure the leakage currents, and generate a number based on the measured leakage currents.

10. The device of claim 9, further comprising:

a plurality of bit lines each connected to the first and third regions for one of the pairs of memory cells for receiving the leakage currents from the first and second channel regions for the one pair of the memory cells;

wherein the controller is configured to generate at least part of the number by subtracting or comparing leakage currents on one of the bit lines from or to leakage currents on another one of the bit lines.

11. The device of claim 10, wherein for each of the bit lines, the leakage currents thereon are the leakage current from the first channel region and the leakage current from second channel region for the one pair of memory cells.

12. A method of identifying a memory device that includes a plurality of memory cells, wherein each of the memory cells includes:

first and second regions formed in a semiconductor substrate, wherein a channel region of the substrate extends between the first and second regions, a floating gate disposed over and insulated from a first portion of the channel region, and a select gate disposed over and insulated from a second portion of the channel region;

the method comprising:

applying one or more positive voltages to the first regions of the memory cells while the memory cells are in a subthreshold state for generating leakage current through each of the channel regions, measuring the leakage currents, and generating a number based on the measured leakage currents.

13. The method of claim 12, wherein the generating of the number at least partially includes subtracting or comparing the measured leakage currents for a first pair of the memory cells from or to the measured leakage currents for a second pair of the memory cells.

14. The method of claim 12, wherein:

a first pair of the memory cells are disposed adjacent to each other, and second pair of the memory cells are disposed adjacent to each other;

the device further comprises:

a first bit line connected to the second regions of the first pair of memory cells;

a second bit line connected to the second regions of the second pair of memory cells;

the generating of the number at least partially includes subtracting or comparing leakage currents on the first bit line from or to leakage currents on the second bit line.

15. The method of claim 12, wherein:
a first pair of the memory cells are disposed adjacent to each other, and second pair of the memory cells are disposed adjacent to each other;
the device further comprises:
   a first bit line connected to the first regions of the first pair of memory cells;
   a second bit line connected to the first regions of the second pair of memory cells;
the generating of the number at least partially includes subtracting or comparing leakage currents on the first bit line from or to leakage currents on the second bit line.

16. The method of claim 12, wherein each of the memory cells further comprises:
an erase gate disposed over and insulated from the first region.

17. The method of claim 16, wherein each of the memory cells further comprises:
a control gate disposed over and insulated from the floating gate.

18. The method of claim 12, further comprising:
applying a positive voltage to the select gates while the memory cells are in a subthreshold state.

19. The method of claim 17, further comprising:
applying a positive voltage to the control gates while the memory cells are in a subthreshold state.

20. A method of identifying a memory device that includes a plurality of pairs of memory cells, wherein each pair of the memory cells includes:
   first, second and third regions formed in a semiconductor substrate, wherein a first channel region of the substrate extends between the first and second regions, and a second channel region of the substrate extends between the second and third regions,
   a first floating gate disposed over and insulated from a first portion of the first channel region,
   a second floating gate disposed over and insulated from a first portion of the second channel region,
   a first select gate disposed over and insulated from a second portion of the first channel region, and
   a second select gate disposed over and insulated from a second portion of the second channel region;
the method comprising:
   applying one or more positive voltages to the second regions, or to the first and third regions, of the memory cells while the memory cells are in a subthreshold state for generating leakage current through each of the first and second channel regions,
   measuring the leakage currents, and
   generating a number based on the measured leakage currents.

21. The method of claim 20, wherein:
the device further comprises a plurality of bit lines each connected to the first and third regions for one of the pairs of memory cells for receiving the leakage currents from the first and second channel regions for the one pair of the memory cells;
the generating of the number at least partially includes subtracting or comparing leakage currents on one of the bit lines from or to leakage currents on another one of the bit lines.

22. The method of claim 21, wherein for each of the bit lines, the leakage currents thereon are the leakage current from the first channel region and the leakage current from second channel region for the one pair of memory cells.

* * * * *